`United States Patent Office`

3,461,146
Patented Aug. 12, 1969

3,461,146
METAL-ORGANIC COMPOUNDS
John Harry Wallice Turner, Chapel-en-le-Frith, and Samuel Edward Harson, Culcheth, near Warrington, England, assignors to Hardman & Holden Limited, Manchester, Lancashire, England, a British company
No Drawing. Continuation-in-part of application Ser. No. 331,911, Dec. 19, 1963. This application Jan. 26, 1968, Ser. No. 700,741
Claims priority, application Great Britain, Dec. 24, 1962, 48,570/62
Int. Cl. C07f 7/00, 7/04, 3/00
U.S. Cl. 260—414      12 Claims

ABSTRACT OF THE DISCLOSURE

Metal-organic compounds are prepared by reacting an alkoxide of a tetravalent element, e.g., silicon, titanium, tin, hafnium and zirconium with a carboxylate of a divalent metal, e.g., a salt of two carboxylic acids having together from 10 to 28 carbon atoms, or a basic salt. The resulting compounds contain at least one divalent metal and at least one tetravalent element, the divalent and tetravalent atoms being linked together through oxygen atoms and their remaining valencies being occupied by carboxylic acid radicals and hydrocarbonoxy radicals.

---

This application is a continuation-in-part of application Ser. No. 331,911, filed Dec. 19, 1963 and now abandoned.

This invention relates to new metal-organic compounds, and to processes for preparing same.

The compounds according to the invention can be represented by the following generic formulae:

(a) 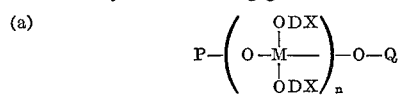

(b) 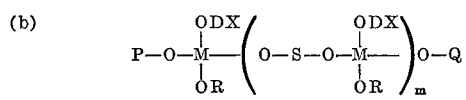

where

M=a tetravalent element selected from silicon, titanium, tin, hafnium and zirconium,
D=a divalent metal selected from zinc, lead, magnesium, cadmium, calcium, strontium, beryllium, mercury, iron barium, cobalt and nickel,
X=a carboxylic acid radical of up to 24 carbon atoms,
R=alkyl up to 12 carbon atoms, aryl or alkaryl up to 16 carbon atoms, or hydrogen,
P=R or DX,
Q=R or DX,
S=D or alkylene upto 10 carbon atoms or diarylene-alkyl up to 15 carbon atoms,
O=oxygen,
n=a whole number from 1 to 10, and
m=a whole number from 1 to 10.

The compounds according to the invention include those which contain two atoms of a divalent metal, or an atom of each of two divalent metals, and an atom of a tetravalent element joined to each of the divalent atoms through oxygen atoms, together with carboxylic acid radicals attached to the divalent atoms and hydrocarbonoxy radicals attached to the tetravalent atoms.

The invention further comprises condensed products of such compounds, in which a number of atoms of a tetravalent element are linked together through oxygen atoms, or through oxygen-divalent metal-oxygen links, or through residues of di- or poly-functional hydroxyl compounds, each tetravalent atom being also linked through oxygen atoms to two divalent metal atoms carrying carboxylicv acid radicals.

In the various formulae and equations used throughout this specification, n is an integer from 1 to 10.

The products may be prepared by the reaction of an alkoxide of a tetravalent element such as silicon, titanium, tin, hafnium, or zirconium with a carboxylic acid salt of a divalent element with the formation of volatile or nonvolatile ester. For example, two molecules of zinc acetate oleate may be reacted with one molecule of tetraethyl orthosilicate with the formation of 2 molecules of ethyl acetate which is distilled off during processing leaving a diluent free condensate, Equation 1.

(1) 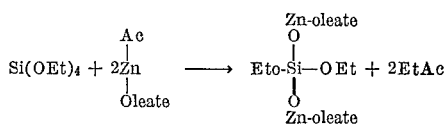

The preferred tetravalent element alkoxides are the ethoxides, propoxides or butoxides, but higher alkoxides having up to 12 carbon atoms in the alkyl groups can be used or mixed alkoxides may be formed by the substitution of some of the lower alkoxide groups by a higher alkoxide group. Alternatively, phenoxides may be used. In addition, partially condensed alkoxides of the tetravalent elements may be used in which the content of tetravalent element is higher than that contained in the simple alkoxide. An example of such a material commercially available is a condensed ethyl silicate known as "Monsanto Silester OS" with a typical silicon content of 41.2% of $SiO_2$ as compared to 28.1% $SiO_2$ in tetraethyl orthosilicate. Other similar products may be obtained by the prior condensation of the tetra alkoxides by reaction with a proportion of water, liberated alcohol being distilled off.

The divalent metal salts used in the processes may be made from one carboxylic acid of up to 24 carbon atoms or from a mixture of carboxylic acid having together from 10 to 28 carbon atoms. For ease of handling in solvent free preparations it is generally preferred to use two carboxylic acids having together about 16–18 carbon atoms, but where one of the lower acids $C_2$–$C_4$ (which yield volatile esters) is used it is generally convenient to use it in conjunction with a higher $C_8$–$C_{24}$ carboxylic acid. In other cases, as for example with calcium and barium, preparation of the salt may be facilitated by the inclusion of a low boiling solvent which can subsequently be removed by distillation before or during the condensation reaction. Salts of lead, magnesium, cadmium, beryllium, mercury, iron, cobalt or nickel may also be used.

Substitution of zinc di-oleate in Equation 1 would result in the formation of the ethyl oleate ester which is nonvolatile at the reaction temperatures used and may be retained as a diluent. This also permits the reaction to be carried out under reflux. A procedure of this kind may be preferred with divalent metals which condense more slowly or which require a higher reaction temperature. In the same connection the use of the condensed tetravalent element alkoxides also permits higher reaction temperatures than the simple alkoxides which have relatively low boiling points. In the case of tetra ethyl orthosilicate, loss of this ester with ethyl acetate of reaction can be minimised by a preliminary reflux or by condensing the first divalent metal group at a reaction temperature of about 140° C., after which higher reaction temperatures can be used. In some instances basic salts of the divalent metals can be used resulting in the formation of ester and free alcohol and a reduction of nonvolatile ester diluent, Equation 2, in which M represents a tetravalent element, X is a carboxylic acid radical and R is an alkyl radical.

(2) $2PbO + 3HX + M(OR)_4 \rightarrow (XPbO)_2 M(OR)_2 + RX + ROH + H_2O$

The divalent metal salts can generally be prepared from the oxides, hydroxides or carbonates or in some cases from the acetates by replacement of one acetic radical by a higher carboxylic acid.

Preferred carboxylic acids are acetic, propionic, isobutyric, natural fatty acids, tall oil fatty acids, naphthenic acids and synthetic liquid or low melting point carboxylic acids, such as "Versatic" acid which consists principally or tertiary carboxylic acids which are fully saturated and highly branched.

The simple condensation products illustrated by Equation 1 can be further condensed or modified in a number of ways.

They may be reacted with water in varying proportions up to 2 mols of water per atom of tetravalent element, Equations 3 and 4, in which D represents a divalent metal.

(3)
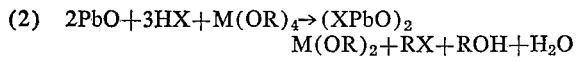

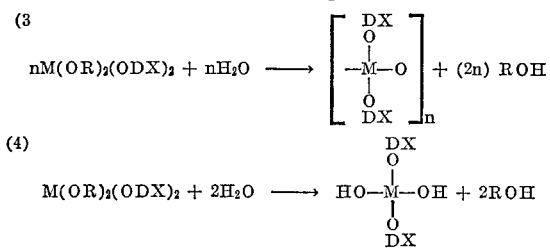

(4)
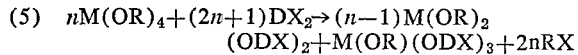

A variation of these reactions is obtained by the condensation of more than two molecules of divalent metal salt with one tetravalent atom according to the general Equation 5.

(5) $nM(OR)_4 + (2n+1)DX_2 \rightarrow (n-1)M(OR)_2(ODX)_2 + M(OR)(ODX)_3 + 2nRX$ Equation 5a illustrates the hydrolysis and condensation by means of water of the mixed product of Equation 5.

(5a) $(n-1)M(OR)_2(ODX)_2 + M(OR)(ODX)_3 + (2n-1)H_2O \rightarrow M_{2n}O_{2n-1}(ODX)_{4n+2} + (4n-2)ROH$ However, it is found in practice that some of the products of Equation 5 are quite resistant to hydrolysis by water, though the hydrolysis and condensation can be catalyzed to some extent by the addition of a small amount of amine such as morpholine. Thus when M=silicon and n=2 and X is a $C_{17}$ unsaturated fatty acid radical the product of Equation 5 is not appreciably hydrolyzed by water alone after 6 hours refluxing in the presence of a small amount of alcohol.

This product can consequently be regarded as a water resistant oil and could easily be introduced into lubricating systems where water is encountered. The same product when dissolved to a 20% solution in mineral lubricating oil and boiled with water for one hour separates into two clear layers on standing for a short time.

As in previous examples, D in Equation 5 may represent one or more than one divalent metal and X may represent one or more than one carboxylic acid radical. This permits variation of the product itself and of the nature of the ash obtained from it on ignition.

The products of Equation 1 and related preparations may also be reacted with higher monohydric alcohols of up to 12 carbon atoms or phenols or alkyl phenols of up to 16 carbon atoms or with difunctional compounds or polyols such as alkylene glycols of up to 10 carbon atoms, diphenylol propane, glycerine mono- and di-esters of monocarboxylic acids of up to 24 carbon atoms and pentaerythritol partial esters. In this way larger molecules can be built up with greater functionality in air drying or stoving surface coatings where the X component is an unsaturated fatty acid such as oleic, linoleic or linolenic, for example Equation 6.

(6) $(n + 2M(OR)_2(ODX)_2 + 2R_1OH + (n+1)d(OH)_2 \rightarrow$

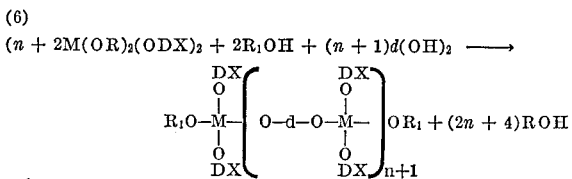

where
$R_1OH$=mono-hydric alcohol or phenol,
$d(OH)_2$=polyol, and
M=tetravalent element.

Another type of condensate or polymer can be obtained by processing tetravalent element alkoxides or condensed alkoxides, which have been partially substituted by divalent metal acylates, to temperatures from about 200° C. to about 370° C. when further ester formation can occur and new linkages —Si—O—D—O—Si— are obtained in which no carboxylic acid remains on part of the divalent metal. The simplest case results from the condensation of $Si(OR)_2(ODX)_2$ according to Equation 7.

(7)
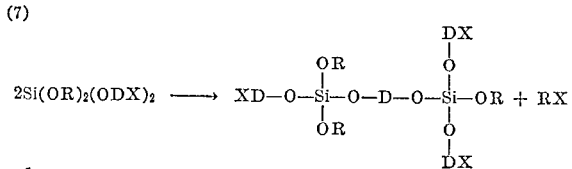

where
D=divalent metal,
X=mono carboxylic acid radical, and
OR=alkoxide or phenoxide group.

The products prepared according to the above processes and equations are obtained as oily liquids, greasy waxy resinous or amorphous solids depending on the choice of organic components and on the degree of condensation. Many of them are soluble in hydrocarbon solvents including mineral lubricating oil and in oxygenated solvents (excluding the lower alcohols and ketones) and in esters and are compatible with various synthetic resins, polymers and elastomers. They are capable of reacting with acids and for this and other reasons they can be used, for example, as stabilisers for PVC or as lubricants or as lubricant additives.

The processes and products of the invention are illustrated by the following examples in which T stands for a tallate group:

EXAMPLE 1

$(TZnO)_2Si(OEt)_2$

This compound was prepared in two stages: Stage 1 is the preparation of anhydrous zinc acetate tallate and Stage 2 is the reaction of zinc acetate tallate with ethylorthosilicate.

Stage 1.—812 g. of tall oil fatty acid were transferred to a 3 necked bolt-head flask fitted with a reflux condenser, stirrer and an adaptor for dropping funnel and thermometer. While stirring 228 g. of zinc oxide were added giving a slurry. The temperature was raised to 70° C. and 176 g. of glacial acetic acid were added slowly. The mixture was then stirred under reflux for 15 minutes. The condenser was changed to the distillation position and water and excess acetic acid was distilled off to a flask temperature of 154° C., applying vacuum in the later stages. A total distillate of 62 ml. was obtained.

Stage 2.—The zinc acetate tallate in the flask was cooled to 130° C. and 291.4 g. of ethyl orthosilicate were slowly added. The flask temperature was slowly raised to distill off the ethyl acetate produced. 275 ml. of distillate were obtained by slowly raising the flask temperature to 225° C. Product yield=1198 g.

The product was obtained as an oily liquid soluble in hydrocarbons and in mineral lubricating oil.

EXAMPLE 2

613.5 g. of $(TZnO)_2Si(OEt)_2$ prepared as in Example 1 was transferred to a 3-necked bolt-head flask fitted with a stirrer, reflux condenser and an adaptor for thermometer and dropping funnel. The temperature was raised to 100° C. and 186.5 g. of iso octyl alcohol were added. The product was refluxed at 120° C. for 1½ hours and then the ethyl alcohol produced was distilled off. Distillation was continued to a flask temperature of 225° C. when 78 ml. of distillate had been collected. Product yield 727 g. The product was obtained as a stable low viscosity oily liquid soluble in mineral lubricating oil in all proportions.

EXAMPLE 3

$Si(OPh)_2(OZnT)_2$ 400 g. of $(TZnO)_2Si(OEt)_2$ prepared as in Example 1 were transferred to a 3-necked bolt-head flask fitted for distillation with a stirrer and thermometer. 87.5 g. of phenol were added and the flask was slowly heated with stirring. Alcohol was distilled off to a flask temperature of 215° C. when 35 ml. had been collected.

The product was obtained as a stable oily liquid miscible in all proportions with mineral lubricating oil.

EXAMPLE 4

$[(TZnO)_2SiO]_n$ 375 g. of $(TZnO)_2Si(OEt)_2$ were prepared as in Example 1 and transferred to a flask fitted with a stirrer and reflux condenser. 7.85 g. of water and 10 ml. of ethyl alcohol were added. The product was refluxed for 2 hours and then the condenser was changed to the distillation position. Alcohol was distilled over to a flask temperature of 270° C. when 41.5 ml. of distillate had been collected. Yield 350 gm.

The product was obtained as an oily liquid of viscosity 40 poises. It was completely soluble in mineral lubricating oil from which some sedimentation occurred on long standing.

After storage for 15 months the product changed to a greasy solid which could be dissolved to a clear solution in mineral oil on heating but deposited some sediment after standing at room temperature for 48 hours.

EXAMPLE 5

$(TPbO)_2Si(OEt)_2$

This compound is prepared in two stages: Stage 1 is in the preparation of anhydrous lead acetate tallate and Stage 2 is the reaction of lead acetate tallate with ethyl orthosilicate.

Stage 1.—870 g. of tall oil fatty acid were transferred to a 3-necked bolt-head flask fitted with a reflux condenser stirrer and an adaptor for dropping funnel and thermometer. While stirring 669.6 g. of litharge were added giving a slurry. The temperature was raised to 60° C. and 190 g. of glacial acetic acid were added slowly. The product was stirred under reflux for 1 hour and then the condenser was changed to the distillation position and water and excess acetic acid was distilled off to a flask temperature of 181° C.

Stage 2.—The lead acetate tallate in the flask was cooled to 154° C. and 312.2 g. of ethyl orthosilicate were added. The product was refluxed for 1 hour and then the ethyl acetate was distilled off. 311 ml. of distillate were obtained by raising the flask temperature to 180° C. Yield 1696 g.

EXAMPLE 6

$(TPbO)_2Si(OC_9H_{19})_2$ 424 g. of $Si(OEt)_2(OPbT)_2$ as prepared in Example 5 were transferred to a flask fitted with a stirrer and reflux condenser and 90 g. of nonanol were added with stirring. The product was refluxed for 1½ hours and then the ethyl alcohol produced was distilled off to a flask temperature of 220° C. 23 ml. of distillate were collected giving a product yield of 493.7 g. of a dark fairly mobile liquid.

EXAMPLE 7

Two mols of zinc acetate tallate were prepared and condensed with 1 mol tetra ethyl ortho silicate as in Example 1 with liberation and removal of 195 cc. of ester distillate while heating the product to 216° C.

Glycerine mono/di-tallate 1:1 mol was made by esterifying 870 g. of tall oil fatty acid (3 mols) with 192 g. of glycerine using xylene 200 cc. in an azeotropic process. Water 55 cc. was removed and the xylene stripped by vacuum distillation to 190° C. Six hundred and sixty seven grammes of this ester were added to the above product at 216° C. and the product was raised to 245° C. and held for one hour. A distillate of 55 cc. mainly ethyl alcohol was obtained. The product was a brown mobile oily liquid.

EXAMPLE 8

$(TMgO)_5Si_2(OR)_3$ 725 g. of tall oil fatty acid were transferred to a three necked two litre reaction flask and while stirring an addition was made of 240 grams of magnesium carbonate (2½ mols). The mixture was heated and 160 grams of glacial acetic acid were run in during 25 minutes. The product temperature was raised to 170° C. in 2 hours and 115 cc. of water and excess acetic acid distilled off, using vacuum in the final stage. Tetra ethyl ortho silicate 208.3 g. were weighed out and slow addition started. The product became viscous and solidified and stirring was stopped. Heating was continued with distillation of ester and the product softened and liquefied about 190° C. The first ester fraction (100 cc.) was found to contain some tetra ethyl ortho silicate. It was therefore returned slowly to the product through a separating funnel and ester (ethyl acetate) distilled slowly from a reaction temperature of 180° C. to a reaction temperature of 200° C. which was held for one hour. Vacuum was used to assist distillation of the ethyl acetate in the final stages and a distillate of 200 cc. was obtained. The final product was a mobile oily liquid at 200° C. but solidified quickly and set to a tough transparent hard solid at room temperature.

EXAMPLE 9

$(TZnO)_2Si(OEt)_2 + (TZnO)_3Si(OEt)$

2½ mols. (1033.5 g.) of zinc acetate tallate were prepared as in Example 1 and cooled to 140° C. 208.3 g. of ethyl o-silicate were added and the temperature was very slowly raised, distilling ethyl acetate. The temperature was increased very slowly, taking a full day to complete the distillation. At a temperature of 225° C. vacuum was applied to remove the last traces of ethyl acetate. A total distillate of 239 ml. was collected giving a yield of 1005 g. of liquid product.

EXAMPLE 10

Zinc acetate tallate-silester reaction product 3 mols of zinc acetate tallate were prepared as in Example 1 and cooled to 138° C. 300 g. of silester (condensed ethyl silicate, 41.2% $SiO_2$) were added and ethyl acetate was slowly distilled off. Over a period of 5 hours, with the flask temperature rising to 262° C. 286 ml. of distillate were recovered. A yield of 1276 gm. of an oily product was obtained.

EXAMPLE 11

Zinc acetate tallate-silester reaction product, reacted with nonanol

Half the product (638 gm.) from Example 10 was reacted with 144 gm. of nonanol as in Example 6, and ethyl alcohol distilled off over a period of 4½ hours to a flask temperature of 250° C. 27 ml. of distillate were obtained. A yield of 754.5 gm. of liquid product was obtained.

EXAMPLE 12

Two moles of zinc acetate tallate was prepared and condensed with one mol of tetraethyl orthosilicate as in Example 1, with removal of 191 cc. of ester at a reaction temperature of 180° C.

Glycerine mono/di-linoleate 1:1 mol was prepared by heating 1316 g. of alkali refined linseed oil to 200° C., adding 26.3 g. of 5% calcium naphthenate and 141 g. of glycerine and holding at 235° C.±5° C. for 3½ hours. Six hundred and forty six grammes of this ester were added to the zinc silicon product above at 180° C. The product was raised to 225° C. in one hour and held at 225° C. for half an hour. 110 cc. of distillate, mainly ethyl alcohol were distilled off and the final product was obtained as a light brown oily liquid.

EXAMPLE 13

Ti(OR)$_2$(OZnT)$_2$ 1 mol of zinc acetate tallate (413.4 g.) was prepared as in Example 1, and cooled to 114° C., and 170 g. of titanium butoxide added. The flask temperature was allowed to rise slowly and n-butyl acetate was distilled off. Over a period of 4 hours, with the flask temperature rising to 239° C., 132 ml. of butyl acetate were collected. A yield of 458 g. of a liquid product was obtained.

EXAMPLE 14

Zr(OR)$_2$(OMgT)$_2$

This compound was prepared in two stages: Stage 1 being the preparation of magnesium acetate tallate and Stage 2 being the reaction of magnesium acetate tallate with zirconium isobutoxide.

Stage 1.—290 g. of tall oil fatty acid were transferred to a 3-necked bolt-head flask fitted with a reflux condenser, stirrer and an adaptor for dropping funnel and thermometer. Whilst stirring, 97 g. (1 mol) of light magnesium carbonate were added giving a slurry. The temperature was raised to 60° C. and 65 g. of glacial acetic acid were slowly added. The mixture was stirred under reflux for 15 minutes and then the condenser was changed to the distillation position. The water and excess acetic acid (45 ml.) were distilled, finally using vacuum at a temperature of 190° C.

Stage 2.—The above product was cooled to 180° C. and 192 g. (½ mol) of zirconium isobutoxide were added. The flask temperature was slowly raised to 200° C. (about 2 hours) and isobutyl acetate was distilled off, finally using light vacuum. A total of 125 ml. of distillate were recovered. The product, a soft yellowish grease at 200° C., was still greasy at room temperature. A yield of 443 g. was obtained.

EXAMPLE 15

580 grams of tall oil fatty acid were transferred to a three necked stirred reaction flask and an addition made of 192 grams of light industrial magnesium carbonate (2 mols). The mixture was heated and an addition made of 128 grams of glacial acetic acid. The product was heated and dehydrated to a reaction temperature of 160° C. using vacuum in the final stages of drying. A total of 85 cc. of water and execess acetic acid was obtained. Condensed ethyl orthosilicate ("Monsanto Silester," SiO$_2$ content 41.2%) 300 grams was added fairly quickly. The product solidified at 50% addition but softened again on complete addition. Stirring was stopped and heating continued. The product thinned considerably and became easily stirrable at 205–210° C. The temperature was raised to 235° C. in 3½ hours and held at 235° C.±5° C. for a further two hours when a total distillate of 182 cc. was obtained. Two hundred grams of the product were removed and on cooling yielded a greasy solid which skinned on contact with air.

EXAMPLE 16

The remainder of the product from Example 15 was cooled to 140° C. and 38.5 cc. of water was added rapidly while stirring. Hydrolysis of residual Si—OR groups occurred rapidly and the product solidified. The final product was a hard waxy substance which could be granulated.

EXAMPLE 17

580 grams of tall oil fatty acid were transferred to a three necked reaction flask and an addition made while stirring of 446 grams of litharge (PbO). The product was heated and at 50° C. an addition of glacial acetic acid 128 grams was started and was completed in 25 minutes. The product was heated and dried at 160° C. using vacuum in the final stages. A distillate of 42 cc. of water plus excess acetic acid was obtained. To the dried product an addition was made of 300 grams of condensed ethyl silicate ("Monsanto Silester," SiO$_2$ content 41.2%) and distillation of ethyl acetate commenced, with release of 60 cc. of distillate at a reaction temperature of 135° C. An addition was made of 234 grams of dioctyl phthalate and reaction continued to 170° C. in one hour. The product was a brown oily liquid at 170° C. and cooled to a soft crumbly gel. A distillate of 155 cc. was obtained.

EXAMPLE 18

EtOSi(OZnT)$_2$ODPPOSi(OZnT)$_2$OEt

This product was prepared in three stages: Stage 1 was the preparation of zinc acetate tallate, Stage 2 the reaction of this product with tetra ethyl orthosilicate and removal of ethyl acetate, and Stage 3, the reaction of this product with diphenylol propane and distillation of ethyl alcohol.

Stage 1.—Two mols of zinc acetate tallate (827 g.) was prepared as in Stage 1 of Example 1.

Stage 2.—The product from Stage 1 was reacted with 208 g. of tetra ethyl o-silicate as in Stage 2 of Example 1.

Stage 3.—The product from Stage 2 was allowed to cool to 150° C. and ½ mol of diphenylol propane was added (114 g.). The temperature was slowly raised, distilling off ethyl alcohol. After raising the temperature to 180° C. and applying vacuum 42 ml. of alcohol were collected. The product was very viscous when hot, and cooled down to a hard solid. Product yield 917.5 g.

EXAMPLE 19

Si(OCdT)$_2$(OEt)$_2$

This compound is prepared in 2 stages: Stage 1 is the preparation of cadmium acetate tallate and Stage 2 is the reaction of cadmium acetate tallate with ethyl orthosilicate.

Stage 1.—290 g. of tall oil fatty acid were transferred to a 3-necked bolt-head reaction flask fitted with a reflux condenser, stirrer and adaptor for thermometer and dropping funnel. Whilst stirring 128.4 g. of cadmium oxide were added followed by 150 ml. of toluene. The flask temperature was allowed to rise slowly whilst glacial acetic acid (65 g.) was added dropwise. The product was allowed to reflux for 3 hours and then the water of reaction, excess acetic acid and toluene were distilled off to a final flask temperature of 180° C. using vacuum to remove the last traces of toluene and water.

Stage 2.—The contents of the flask were allowed to cool to 150° C. and 104.2 g. of ethyl orthosilicate were added. Using a claissen head, ethyl acetate was distilled to a flask temperature of 190° C. using vacuum in the last stage. 74 ml. of ethyl acetate were collected giving a yield of 488 g. of product. When cold the product was a metallic grey viscous liquid. On exposure to air in a thin film it changes to a transparent straw coloured waxy solid.

EXAMPLE 20

Calcium oleate-silester reaction product

This product was prepared in two stages: Stage 1 being the preparation of calcium oleate in toluene solution and Stage 2 the reaction of silester (condensed ethyl silicate, 41.2% $SiO_2$) with the product from Stage 1 with subsequent removal of the solvent.

Stage 1.—630 g. of oleic acid (2.2 mols) were transferred to a 3-necked 2 litre bolt-head flask fitted with a Dean & Starke offtake, stirrer and adaptor for dropping funnel and thermometer. 300 g. of toluene, followed by 75 g. (1 mol) of hydrated lime were added. After stirring for 15 minutes the temperature was raised until the toluene started to distill. Distillation was continued until 36 g. of water had been collected from the Dean & Stark attachment.

Stage 2.—The toluene from the Dean & Stark attachment was returned to the flask and a normal distillation head was fitted. 150 g. of silester was then added to the flask contents and the temperature was slowly raised to distill the toluene. As the toluene was removed the product become more viscous but remained stirrable. Over a period of 2½ hours, with the temperature rising to 215° C. and vacuum being applied to remove the last traces, 350 ml. of toluene were recovered. The product was a very viscous liquid at 216 °C. and a soft light brown solid when cold.

EXAMPLE 21

720 g. of naphthenic acid (3 mols) were transferred to a three necked flask fitted with stirrer, thermometer and distillation head. An addition was made of zinc oxide 122.1 g. and litharge PbO 334.5 g. followed at 60° C. by the slow addition of 190 g. of glacial acetic acid. The product was heated to 110° C. and refluxed for one hour after which 64 cc. of water and excess acetic acid were removed by distillation. An addition was made of 208.1 grams of tetraethyl orthosilicate and dioctyl phthalate 233 grams. The product was reacted at 150–160° C. for 2 hours with vacuum during the final hour with removal of 260 cc. of ester distillate. The product was obtained as a dark brown viscous liquid.

EXAMPLE 22

Litharge 446 g. and nonanol (3,5,5-trimethyl hexanol) 144 g. were slurried with stirring in a three necked reaction flask. An addition was made of 720 g. (3 mols) of naphthenic acid and the product raised to 119° C. while 18 cc. of water was distilled off. Tetraethyl orthosilicate 208.3 g. was added over a temperature range of 115° C.–93° C. The temperature was raised from 93° C. to 146° C. in 1½ hours with distillation of released ethyl alcohol. Heating continued to 180° C. in a further 1½ hours during which the product thickened and darkened and subsequently thinned out. A distillate of 118 cc. was obtained and after continued heating at 185±5° C. for 2 hours the product was obtained as a dark grey colloidal viscous liquid.

EXAMPLE 23

To 809.5 grams of the product of Example 9 in a three necked reaction flask an addition was made of a mixture of 10.7 g. of water and 14.3 cc. of ethyl alcohol. The product was heated and stirred under reflux for 4½ hours. The apparatus was then changed to distillation and ethyl alcohol distilled off to a temperature of 146° C. A distillate of 25 cc. was obtained. While holding the product temperature at 150±5° C. the distillate was returned dropwise with redistillation of the ethyl alcohol. In 1½ hours reaction a distillate of 30 cc. was obtained. The distillate of water and alcohol was returned twice in like manner at reaction temperature of 150–165° C. The final volume of distillate obtained was 35.5 cc. against a theory of 81.8 cc. of ethyl alcohol showing that the product of Example 9 was only partially hydrolysed and condensed.

At this stage the product was obtained as a moderately viscous oily liquid and 190.5 g. were removed for examination. To the residue in the flask an addition was made of 3.5 grams of morpholin and a proportionate amount (28 cc.) of the aqueous alcoholic distillate obtained above and refluxing with stirring was continued for 3 hours followed by distillation to 225° C. in 2 hours and holding at this temperature for a further 2 hours. Vacuum was used in the final stages for distillation and a total volume of 36.5 cc. of distillate was obtained. The final product cooled to a viscous oily liquid.

Samples of the final product and of the intermediate products were dissolved in Carnea 25 mineral oil at a concentration of 25% and boiled with water for 1 hour. Negligible emulsification occurred and both treated samples separated into clear oily and aqueous layers on standing for a short time.

EXAMPLE 24

CoXac—silester reaction product. HX=Naphthenic acid

This compound was prepared in two stages: Stage 1 being the preparation of cobalt acetate naphthenate and Stage 2 being the reaction of cobalt acetate naphthenate with silester.

Stage 1.—480 g. of naphthenic acid (equivalent weight 240) were transferred to a 3-necked bolt-head flask fitted with a reflux condenser, stirrer and an adaptor for dropping funnel and thermometer. Whilst stirring 300 ml. of toluene followed by 192 g. of cobalt hydrate were added giving a slurry. The heat was switched on and 130 g. of acetic acid were added dropwise. The product cleared and thickened up. The condenser was changed to a Dean and Stark distillation and water was taken off. When most of the water had been collected, the apparatus was changed to simple distillation and both toluene and water were taken off, to a flask temperature of 180° C., using vacuum to recover the last of the toluene. 80 ml. of water and 300 ml. of toluene were collected.

Stage 2.—The above product was allowed to cool for 15 minutes and then 300 g. of silester (condensed ethyl silicate, 41.2% of $SiO_2$) were added. The product thickened and the heat was turned up. The temperature was slowly raised (over about 2 hours) to 183° C. and 153 ml. of ethyl acetate were distilled off, finally using vacuum. A yield of 862 g. of product was obtained. The product was liquid at the temperature of preparation but solid at room temperature. A solution of the product was made in white spirit at 10% cobalt content and was obtained as a blue purple low viscosity liquid.

EXAMPLE 25

Reaction product of $Si(OR)_4$ and zinc dipelargonate

This product was prepared in three stages: Stage 1 was the replacement of ethoxy groups on silicon in ethyl orthosilicate by nonanoxy groups, Stage 2 was the preparation of zinc diperlargonate, and Stage 3 was the reaction of the products from the first two stages.

Stage 1.—577 gm. (4 mols) of nonanol were transferred to a 3-necked 2-litre bolt-head flask fitted with stirrer, distillation head and an adaptor for dropping funnel and thermometer. 208.3 g. of ethyl orthosilicate (1 mol) was added by dropping funnel, taking care to avoid unnecessary contact with moist air. The temperature was slowly raised and ethyl alcohol was distilled off. The distillation proceeded very slowly taking a full day. 215 ml. of distilate were obtained with the flask temperature rising to 185° C. Yield at this stage 600 g. (theory yield 601.1 g.).

Stage 2.—162.8 g. of zinc oxide (2 mols) and 400 ml. of xylene were transferred to a 3-necked bolt-head flask fitted with a reflux condenser, stirrer and adaptor for dropping funnel and thermometer. Whilst stirring the temperature was raised to 80° C. and 636 g. (4 mols) of commercial pelargonic acid were added by dropping funnel.

The flask temperature was raised to 102° C. A Dean & Stark attachment was fitted and the water of reaction was removed. After the water had been removed the apparatus was changed over to normal distillation and the xylene removed, finally under light vacuum.

Stage 3.—The product from Stage 2 was allowed to cool to 142° C. and the product from Stage 1 was added. The temperature was raised to 216° C. for four hours. A yield of 1354.5 g. of a mobile brown liquid was obtained (theory yield 1363.8 g.).

On analysis of the final product, estimation of pelargonic acid attached to zinc gave a figure of 13.5% against a theory of 23.3% required by $Si(OR)_2(OZnX)_2$. This shows that condensation of the type illustrated by Equation 8 has proceeded beyond the dimer stage.

EXAMPLE 26

The product was made in three stages: in Stage 1 silester (41.2% $SiO_2$) was further condensed by reaction with water in the presence of hydrochloric acid catalyst and released ethyl alcohol was removed by distillation; in Stage 2 zinc acetate tallate was prepared as previously described; in Stage 3 the condenser silester from Stage 1 was reacted with zinc acetate tallate in the approximate ratio of 3 zinc atoms per 4 OR groups.

Stage 1.—Water 37.3 g. ethyl alcohol 210 cc. and 40 g. of a 5% solution of hydrochloric acid in ethyl alcohol were mixed in a 3-necked reaction flask equipped with stirring and with reflux or distillation and an addition was made while stirring of 1000 g. of silester. The product was heated to 80° C. and then stood over a week-end at room temperature. After refluxing for 30 minutes, distillation of alcohol was carried out in 3 hours to a final product temperature of 205° C. A distillate of 510 cc. alcohol was obtained against a theory of 500 cc. and a product yield of 826 g. against theory 835.4 g.

Stage 2.—Zinc acetate tallate was prepared as previously described from zinc oxide 162.8 g. (2 mols), tall oil fatty acid 580 g. (2 mols) and acetic acid 130 g., with final drying at 180° C. under vacuum when a distillate of 46.5 cc. was obtained.

Stage 3.—To the zinc acetate tallate from Stage 2 at 170° C. an addition was made over a period of 20 minutes of 201 g. of the condensed silester from Stage 1. The mixture was heated to 170° C. in 1 hour, to 180° C. in a further hour and held at 195–203° for a further 1¼ hours. The ethyl acetate distillate obtained at this point was 110 cc. A sample 196 g. taken at this point was found to be a viscous liquid and on analysis and separation of the nonvolatile ester gave a figure of 17.5%.

The remainder of the product was reheated from 160° C. to 224° C. in 1½ hours and held at 235±5° C. for 30 minutes and then cooled to room temperature. The final product 672 g. was obtained as a resilient nontacky greasy solid together with an additional 35 cc. of ethyl acetate distillate.

Analysis and separation of nonvolatile ester in the final product yielded a figure of 9.5%.

A 40% solution of the final product in Carnea 25 mineral oil was found on filtration to contain a small amount of inorganic residue but was easily clarified by filtration.

EXAMPLE 27

Reaction product of magnesium acetate tallate with condensed silester

This product was prepared in three stages: Stage 1 was the preparation of condensed silester, Stage 2 the preparation of magnesium acetate tallate, and Stage 3 the reaction of the products of the first two stages.

Stage 1.—The stage described in Stage 1 of Example 26.

Stage 2.—190 g. of heavy magnesium carbonate B.P. (2 mols) were added to 580 g. of tall oil fatty acid in a three-necked bolt-head flask fitted with thermometer, reflux condenser and stirrer. 1 ml. of a dilute solution of silicone antifoam was added. The product was heated with vigorous stirring. At a temperature of 80° C. 130 g. (2 mols+10 g. excess) of glacial acetic acid were slowly added. The temperature was raised to refluxing temperature and maintained for 15 minutes. The apparatus was changed over to distillation and the excess acetic acid and water were distilled off to a flask temperature of 218° C., using vacuum in the final stages. A total distillate of 75 ml. was obtained.

Stage 3.—The contents of the flask were allowed to cool to 160° C. and 201 g. of condensed silester (prepared in Stage 1 of Example 26) were added. The product was fairly viscous at this stage and heating was continued. The temperature was slowly raised to 230° C. using vacuum in the final stage. A total distillate of 94 ml. of ethyl acetate was obtained. The product was viscous when hot and a resilient resinous solid when cold. Product yield 841 g.

EXAMPLE 28

Reaction product of magnesium acetate tallate with condensed silester

This product was prepared in three stages as in Example 27 but using a smaller ratio of silester.

Stage 1 and Stage 2 were identical with the corresponding stages of Example 27.

Stage 3.—146.8 g. of condensed silester prepared as in Stage 1 of Example 26 were added to the product of Stage 2 of Example 27 at 220° C. The flask temperature was slowly raised to 245° C. applying vacuum in the final stages. A distillate of 89 ml. of ethyl acetate was obtained. 776 g. of a resilient resinous solid was obtained.

EXAMPLE 29

Reaction of nickel acetate with silester 124.4 g. of nickel acetate tetra hydrate (½ mol) was refluxed with 400 ml. of toluene in a flask fitted with stirring and Dean & Stark attachments, until 37 ml. of aqueous distillate was removed.

330 ml. of toluene were removed by filtration and an addition made of 216 g. of silester (equivalent to 1.5 Si). The flask was fitted with distillation head and the temperature raised to 200–205° C. and held for 1½ hours with further reaction at 180° C.–175° C. for 3 hours. A distillate of 120 ml. was obtained containing, in addition to toluene just over ½ mol of ethyl acetate and indicating about one Ni—O—Si bond per nickel atom.

The final product weighed 237 g. and cooled to a black pasty solid.

We claim:
1. A compound selected from the group consisting of:

(a) 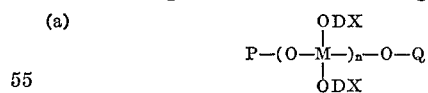

and (b) 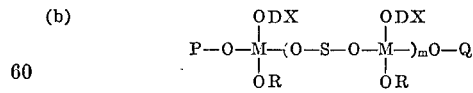

where

M = a tetravalent element selected from the group consisting of silicon, titanium, tin, hafnium and zirconium;

D = a divalent metal selected from the group consisting of zinc, lead, magnesium, cadmium, calcium, strontium, beryllium, mercury, iron, barium, cobalt and nickel;

X = a carboxylic acid radical selected from the group consisting of acetic, oleic, linoleic, linolenic, naphthenic, pelargonic, tall oil fatty acids, propionic, isobutyric and Versatic;

R = alkyl up to 12 carbon atoms, phenyl, or hydrogen;

P = R or DX;

Q=R or DX;
S=D or alkylene up to 10 carbon atoms or diphenylol propane;
O=oxygen;
$n$=a whole number from 1 to 10;
$m$=a whole number from 1 to 10.

2. A compound as claimed in claim 1, which contains two atoms of a divalent metal and an atom of a tetravalent element joined to each of the divalent atoms through oxygen atoms, together with carboxylic acid radicals attached to the divalent atoms and hydrocarbonoxy radicals attached to the tetravalent atoms.

3. A compound as claimed in claim 1, which contains an atom of each of two divalent metals and an atom of a tetravalent element joined to each of the divalent atoms through oxygen atoms, together with carboxylic acid radicals attached to the divalent atoms and hydrocarbonoxy radicals attached to the tetravalent atoms.

4. A compound according to claim 2 in which a number of atoms of a tetravalent element are linked together by linking means selected from the group consisting of oxygen atoms, oxygen-divalent metal-oxygen links, diphenylol propane and glycerine mono- and di-esters of an acid selected from the group consisting of tall oil fatty acids and linoleic acid, each tetravalent atom being also linked through oxygen atoms to two divalent metal atoms carrying carboxylic acid radicals.

5. A compound according to claim 3 in which a number of atoms of a tetravalent element are linked together by linking means selected from the group consisting of oxygen atoms, oxygen-divalent metal-oxygen links, diphenylol propane and glycerine mono- and di-esters of an acid selected from the group consisting of tall fatty acids and linoleic acid, each tetravalent atom being also linked through oxygen atoms to two divalent metal atoms carrying carboxylic acid radicals.

6. A process for preparing compounds as claimed in claim 1, in which an alkoxide of one of said tetravalent elements derived from an alcohol of up to 12 carbon atoms, is reacted with a carboxylate salt of a divalent metal, the carboxylate group being derived from an acid selected from the group consisting of acetic, oleic, linoleic, linolenic, naphthenic, pelargonic, tall oil fatty acids, propionic, isobutyric and Versatic, and said divalent metal is selected from the group consisting of zinc, lead, magnesium, cadmium, calcium, strontium, beryllium, mercury, iron, barium, cobalt, and nickel.

7. A process as claimed in claim 6, in which the alkoxide is a condensation product of up to four molecules of a monomeric alkoxide.

8. A process as claimed in claim 6, in which the divalent metal salt is a basic salt.

9. A process as claimed in claim 6, and in which the reaction product is condensed by reaction with up to 2 mols of water per atom of tetravalent element.

10. A process as claimed in claim 6, and in which the reaction product is condensed by heating to 200°–370° C.

11. A process as claimed in claim 6, in which the divalent metal salt is a salt of two monocarboxylic acids having together from 10 to 28 carbon atoms, wherein one of said monocarboxylic acids has from 2 to 4 carbon atoms.

12. A process as claimed in claim 6, and in which the reaction product is further reacted with a substance selected from the group consisting of monohydric alcohols of up to 12 carbon atoms, phenol, diphenylol propane and glycerine mono- and di-esters of an acid selected from the group consisting of tall oil fatty acids and linoleic acid.

References Cited

UNITED STATES PATENTS 3,083,217   3/1963   Sawyer et al. _ _ _ _ _ _ 260—414

ALEX MAZEL, Primary Examiner

J. A. NARCAVAGE, Assistant Examiner

U.S. Cl. X.R.

252—35; 260—45, 413, 429, 431, 432, 439, 448